(12) United States Patent
Kuroki et al.

(10) Patent No.: US 6,726,211 B1
(45) Date of Patent: Apr. 27, 2004

(54) SEALING DEVICE (75) Inventors: Yuichi Kuroki, Fujisawa (JP); Akira Yamaguchi, Fukushima (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/615,502

(22) Filed: Jul. 13, 2000

(51) Int. Cl.$^7$ ................................................ F16J 15/32
(52) U.S. Cl. ........................ 277/353; 277/559; 277/560
(58) Field of Search ................................ 277/559, 562, 277/565, 560, 353

(56) References Cited

U.S. PATENT DOCUMENTS

| | | | | |
|---|---|---|---|---|
| 3,534,969 A | * | 10/1970 | Weinand | 277/309 |
| 3,606,353 A | * | 9/1971 | Heinl | 277/559 |
| 3,640,542 A | * | 2/1972 | Mowat et al. | 277/559 |
| 4,546,985 A | * | 10/1985 | Forch | 277/560 |
| 5,649,709 A | * | 7/1997 | Munekata et al. | 277/560 |
| 5,649,710 A | * | 7/1997 | Kanda | 277/371 |
| 5,759,466 A | | 6/1998 | Onuma et al. | 264/161 |
| 6,036,193 A | * | 3/2000 | Onuma et al. | 277/559 |
| 6,045,138 A | * | 4/2000 | Kanzaki | 277/562 |

FOREIGN PATENT DOCUMENTS

| | | | | |
|---|---|---|---|---|
| JP | 56150666 A | * | 11/1981 | ............ F16J/15/32 |
| JP | 57179472 A | * | 11/1982 | ............ F16J/15/32 |
| JP | 7-301339 | | 11/1995 | |

* cited by examiner

Primary Examiner—Anthony Knight
Assistant Examiner—Michael J. Kyle
(74) Attorney, Agent, or Firm—Jacobson Holman PLLC (57) ABSTRACT

A sealing device including a fitting portion fixed on a first surface forming an annular gap with a second surface; and a seal supported by a support provided at the fitting portion and including a plurality of axial lips whose tips come into contact with the second surface. The annular gap is sealed for the purpose of isolating a sealed side and a non-sealed side, and ribs for pumping a sealing fluid to the sealed side are formed on the lips at the non-sealed side.

5 Claims, 6 Drawing Sheets

SEALING DEVICE

BACKGROUND OF THE INVENTION

1. Field of the Invention

The present invention relates to a sealing device having a plurality of lips.

2. Description of Related Art

A sealing device 100 (i.e. a so-called oil seal) has been used in order to prevent leakage of a sealing fluid in a driving force transmitting section or the like where the sealing fluid (e.g. a working fluid or a hydraulic fluid) is used to drive a unit. Referring to a cross-sectional view in FIG. 6, the sealing device 100 prevents fluid to be sealed from leaking via an annular gap 103 between an inner surface of an axial opening 101a of a housing 101 and an outer surface 102a of a rotary shaft 102 inserted into the axial opening 101a. The sealing device 100 is annular and includes: a reinforcing ring 105 having a substantially L-shaped cross section; a fitting part 106 made of an elastic rubber material and covering the reinforcing ring 105 as an integral part thereof; and a seal portion 107. The reinforcing ring 105 is provided with an axial part 105a extending along the housing 101, and a radial part 105b folded radially inward (at a non-sealed side O) at one end of the axial part 105a.

Figure 6:
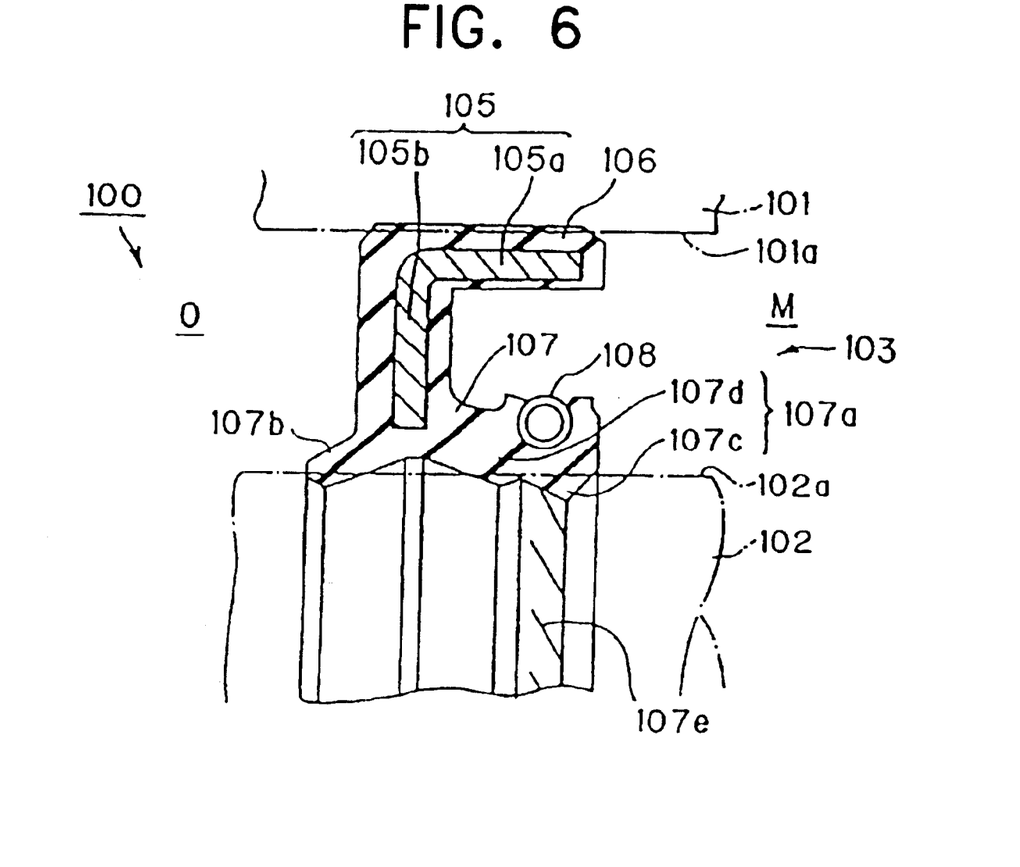
FIG. 6 is a partial cross sectional view of a sealing device in the related art.

The sealing section (or portion) 107 includes a main seal 107a which extends from the radial part 105b toward the sealed side M and is in contact with the outer surface 102a, a rubbing surface, of the shaft 102, and a dust seal 107b which extends toward the atmosphere (or air or non-sealed) side O and is in contact with the outer surface 102a.

The main seal 107a is provided with first and second lips 107c and 107d along the axial of the sealing device 100 since a single lip cannot maintain stable contact with the shaft 102 which not only rotates but also reciprocates, or which may be entered into the axial opening 110a in an eccentric manner.

The main seal portion 107a can behave reliably because of the two lips 107c and 107d.

In order to improve the sealing performance of the main seal 107a, the first lip 107c has ribs 107e for promoting a pumping effect. The ribs 107e maybe realized by forming spiral grooves or ridges, or forming slits or the like, depending upon effects to be accomplished. A spring 108 applies tension to the main seal 107a to urge the lips 107c and 107d toward the shaft 102.

In the foregoing related art, only the first lip 107c is provided with the ribs 107e. There has been a strong demand or improving the sealing performance in order to promote the pumping effect.

Generally speaking, the sealing performance of the lip is determined hydrodynamically on the basis of the tension applied to a rubbing surface by a lip tip, a lip angle formed by a non-sealed side slope of a sealing lip and the axial direction of the sealing device (e.g. a lip angle actually formed by the slope of the lips 107d, 107c and the axial direction of the sealing device 100, in a cutting plane passing through the axially center line of the sealing device 100), and properties of the material (surface roughness or the like) of the lips. The sealing device is usually designed by appropriately setting the foregoing parameters. Further, the pumping effect realized by the ribs also contributes to improvement of the sealing performance.

It is usually considered that the pumping effect is realized by varying distribution of contact pressure with an outer surface of a shaft, in the axial direction of the shaft, in an area in contact with the outer surface 102a, the rubbing surface, of the shaft 102 with which a lip tip comes into contact near the ribs (e.g. a gradient of pressure directed to the sealed side M from the non-sealed side O is made as small as possible in order to allow the sealing fluid to move with ease), and by introducing the leaked fluid from the air side to the rubbing surface via the ribs.

One of the most difficult problems to be avoided is that the lip tip may be worn out and changed in shape during the operation of the sealing device. Further, there is a problem that the pumping effect of the ribbed lip may change with progress of wearing of the ribs during use of the sealing device.

A lip that is ribbed to its tip can pump during its initial use in a particularly effective manner at the time there is a relative movement between the sealing device and shaft. However, such a lip is most extensively deformed or worn during initial use because of abrasion of the ribbed portion, and there is a large variance, with operation of the sealing device, in the balance between an amount of fluid leaking onto the rubbing surface and an amount of fluid returned by the pumping effect.

Therefore, there has been demand for a sealing device that can maintain its reliable sealing performance for a long period of time as long as the lips can cope with the eccentricity of the shaft it is attached and can demonstrate high pumping effect despite of wearing (or abrasion) of a ribbed lip at the initial stage of use.

The present invention has been contemplated in order to overcome the foregoing problems of the related art, and is intended to provide a sealing device which can maintain reliable sealing performance for a long period of time from the initial use.

SUMMARY OF THE INVENTION

According to the invention, there is provided a sealing device comprising: a fitting portion fixed on a first surface forming an annular gap with a second surface; and a sealing portion supported by a support provided in the sealing device and including a plurality of lips placed axially whose tips come into slidingly contact with the second surface. In the sealing device, the annular gap is sealed by the sealing device for the purpose of isolating a sealed side and a non-sealed side, and ribs for pumping fluid to be sealed are formed on each slope in the non-sealed side of the plurality of the seal lips.

This configuration is effective in pumping back the fluid to be sealed toward the sealed side, improving the sealing performance.

At least one of the lips is preferably provided with a non-ribbed portion between its lip tip and the sealed side end of ribs which are placed on the non-sealed side slope of the lip. Namely the tips of the ribs are not connected to the tip of the lip.

The non-ribbed portion around radially inner peripheral portion of the lip tip suppresses leakage of the fluid to be sealed even at the time there is no relative sliding movement between the shaft and the sealing lips during the initial use of the sealing device.

It is preferable that at least one of the lips nearer to the sealed side than the lip having a non-ribbed portion is provided at its tips with an annular or band-like contact area which has a lip angle that is smaller than a lip angle formed by surface of the sloped non-sealed side and the axial direction of the sealing device. The band-like contact area contacts circumferencially with the second surface. The contact area functions identically to the lip tips which have been worn out after the initial use, and is effective in assuring reliable sealing performance and promoting pumping fluid to be sealed back to the sealed side when the contact area is in contact with the second surface, or the rubbing surface.

The band-like contact area, which is faced to the non-sealed side, is more preferably provided with ribs in order to further promote pumping back the sealing fluid.

The ribs on the contact effectively pump back fluid to be sealed by the ribs from the beginning of its use.

After initial use and ribs on the contact area disappeared due to wear, pumping effect can be secured because ribs on the second lip appear due to abrasion of the second lip, exerting pumping effect.

Therefore, the sealing device can not only prevent the leakage of the sealing fluid during initial use but also assure a reliable pumping operation during use.

It is preferable that a lip angle of the band-like area is smaller than that of the lip having the band-like area. The lip angle is defined as an angle between a slope of non-sealed side and the axial direction of the sealing device.

The ribs are preferably realized by spiral ridges projecting from the slopes of each lips. Lips are ribbed on the surface of molds by cutting or stamping using hard objects. The molds can therefore be easily manufactured at a reduced cost.

It is preferable that the non-ribbed portion has a width between 0.1 to 0.5 mm from the lip tip.

Other objects and advantages will become apparent from the following specification taken in connection with the accompanying drawings.

DETAILED DESCRIPTION OF THE PREFERRED EMBODIMENTS

Embodiment 1

Figure 1:
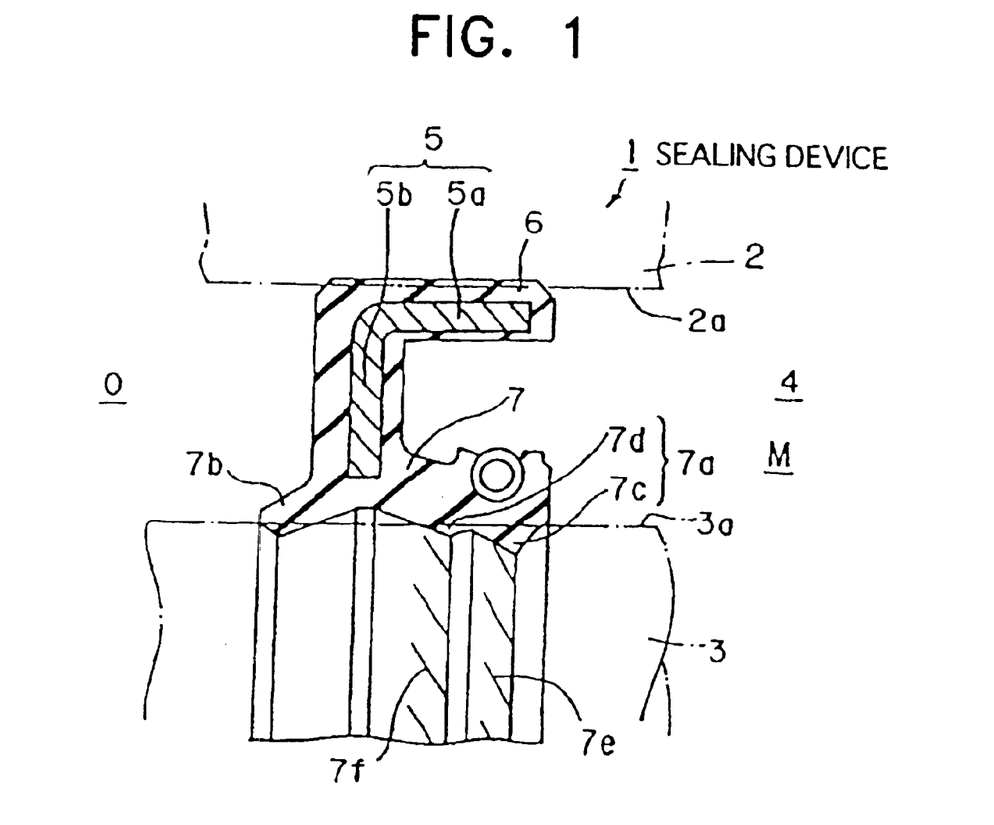
FIG. 1 is a partial cross sectional view of a sealing device according to a first embodiment of the invention.

FIG. 1 shows the configuration of a sealing device 1 according to a first embodiment of the invention. The sealing device 1 seals an annular gap 4 formed between two opposite surfaces, i.e. between an axial opening 2a of a housing 2 and an outer surface 3a of a shaft 3.

The sealing device 1 is annular and includes: a reinforcing ring 5 having a substantially L-shaped cross section; a fitting portion 6 made of an elastic rubber material and covering the reinforcing ring 5 as an integral member; and a sealing section 7. The reinforcing ring 5 has an axial part 5a extending along an axial direction of the sealing device 1 and a radial part 5b which is folded radially inward at one end of the axial part 5a (i.e. near a non-sealed side or an atmosphere side O).

The sealing section 7 includes a main seal 7a extending toward a sealed side or oil side M from the radial part 5b, and a dust seal 7b extending toward the non-sealed side O, i.e. the atmosphere side.

The main seal 7a is provided with two lips 7c and 7d which are placed in the axial direction of the sealing device 1 and faced to the outer surface 3a of the shaft 3.

The two lips 7c and 7d are provided to assure that the main seal 7a behaves in a reliable manner in sealing the annular gap 4.

In order to improve the sealing performance of the main seal 7a, ribs 7e and 7f are formed on the non-sealed side slope of lips 7c and 7d, thereby offering the pumping effect for returning fluid to be sealed back to the sealed side M. The ribs 7e and 7f may be realized by forming spiral grooves or ridges, or forming slits or the like on the lips 7c and 7d, depending upon the desired effects.

A spring 8 applies tension to the main seal 7a to secure sealing.

The main seal 7a can not only assure an excellent pumping effect by the ribs 7e and 7f formed on the lips 7c and 7d, but also can improve the sealing performance.

The dust seal 7b at the non-sealed side O, where is an axially opposite side of the main seal 7a, is effective in preventing foreign objects from entering into the main seal part 7a, which is effective in protecting the main seal 7a against damage, and prevents foreign objects from entering into the sealed side M. The angle between the long direction of the ribs 7e and 7f and the peripheral direction of the lip tip can be determined arbitrary according to the condition of its use.

Embodiment 2

Figure 2A:
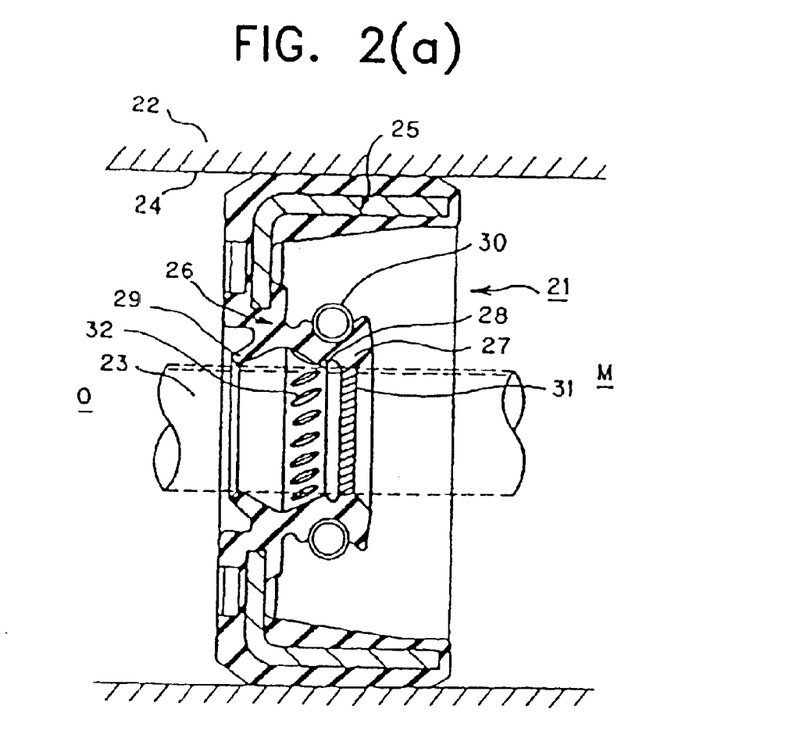
FIGS. 2(a) and 2(b) are partial cross sectional views of a sealing device in accordance with a second embodiment of the invention.
Figure 2B:
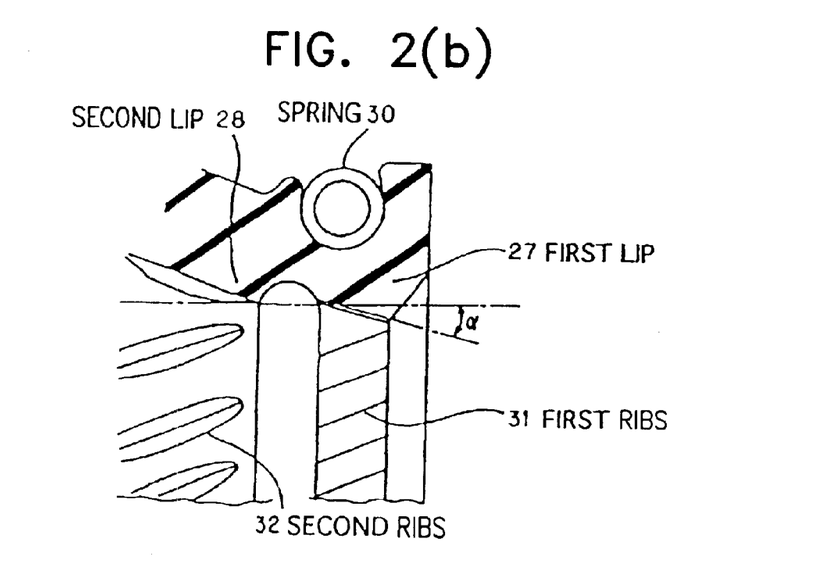

FIG. 2(a) is a partial cross sectional view of a sealing device 21 according to a second embodiment of the invention, and FIG. 2(b) is an enlarged cross sectional view of first and second lips 27 and 28 of the sealing device 21 in FIG. 2(a). Referring to FIG. 2(a), the sealing device 21 is disposed between a housing 22 and a rotary shaft 23 which are concentrically assembled so as to be capable of being rotated relatively to each other.

The sealing device 21 includes an annular seal body 25 fitted into and fixed in an axial opening 24 of the housing 22, and a sealing section 26 which is integral with the radially inner portion of the seal body 25 and is provided with first and second lips 27 and 28, and a dust lip 29. The first and second lips 27 and 28 slide on the rotary shaft 23 in order to prevent leakage of fluid to be sealed. The dust lip 29 prevents intrusion of dust from the outside.

The sealing device 21 has a reinforcing metal ring which is housed in the seal body 25 and has a substantially L-shaped cross section as shown in FIG. 2(a). Specifically, an elastic rubber material is molded on the surface of the reinforcing metal ring.

The first lip 27 axially extends from the axially tip of the second lip 28 at the root of the sealing section 26. The first and second lips 27 and 28 form a two-tier structure.

A spring 30 is provided on the radially outer surface of the first and second lips 27 and 28 in order to increase urging force for pressing the lips 27 and 28 to the rotary shaft 23.

In this embodiment, the dust lip 29 is provided on the side of the non-sealed side O. Fluid to be sealed such as oil, water, or chemicals is housed in the sealed side M where the first and second lips 27 and 28 are provided.

The first and second lips 27 and 28 are provided with first and second ribs 31 and 32 which exert the screw pumping operation when there is a relative movement between the sealing device and the shaft 23. The first ribs 31 have spiral ridges lower in height from their base than those of the second ribs 32.

Specifically, the first ribs 31 are small in their height and width, and placed spirally parallel each other, while the second ribs 32 are larger in both height and width than the first ribs 31 and are in the shape of a bilge, while the shape of the ribs 31 is rather uniform in shape in cross section along its long direction.

Referring to FIG. 2(b), the first lip 27 has a smaller inner diameter from a concentric point of view with respect to the rotary shaft 23, than the inner diameter of the second lip 28, and is designed so as to come into contact with the rotary shaft 23 more extensively than the second lip 28. The ratio of inner diameter of the second lip/that of the first lip is from about 1.005/1.000 to about 1.05/1, preferably from about 1.01/1 to about 1.03/1. For example, when the inner diameter of the second lip is 33.5 mm, the inner diameter of the first lip is 33.0 mm. This is effective in preventing the second ribs 32 from coming into contact with the rotary shaft 23 prior to the first ribs 31.

In this sealing device 21, the first lip 27 is supported by the second lip 28. Therefore, even at the time the rotary shaft 23 becomes to be an eccentric movement, the second lip 28 can cope with the eccentricity of the rotary shaft 23, so that the first lip 27 can maintain uniform sealing performance around the rotary shaft 23. This also enables the first ribs 31 to be in uniform contact with the rotary shaft 23, which is effective in maintaining the amount of fluid to be pumped via the first ribs 31 even when the rotary shaft 23 becomes eccentric.

In the foregoing sealing device 21, the first lip 27 can uniformly seal the outer surface of the rotary shaft 23 even if the rotary shaft 23 becomes eccentric. Therefore, it is possible to prevent the tip of the first lip 27 from coming out of contact with the rotary shaft 23, or to prevent air leakage. Further, even if the pumping amount is reduced due to wearing of the first lip 27, the ribs 32 of the second lip 28 come into contact with the rotary shaft 23, thereby compensating for the reduced pumping amount. Therefore, the sealing device 21 can maintain its overall pumping amount of fluid.

Figure 3A:
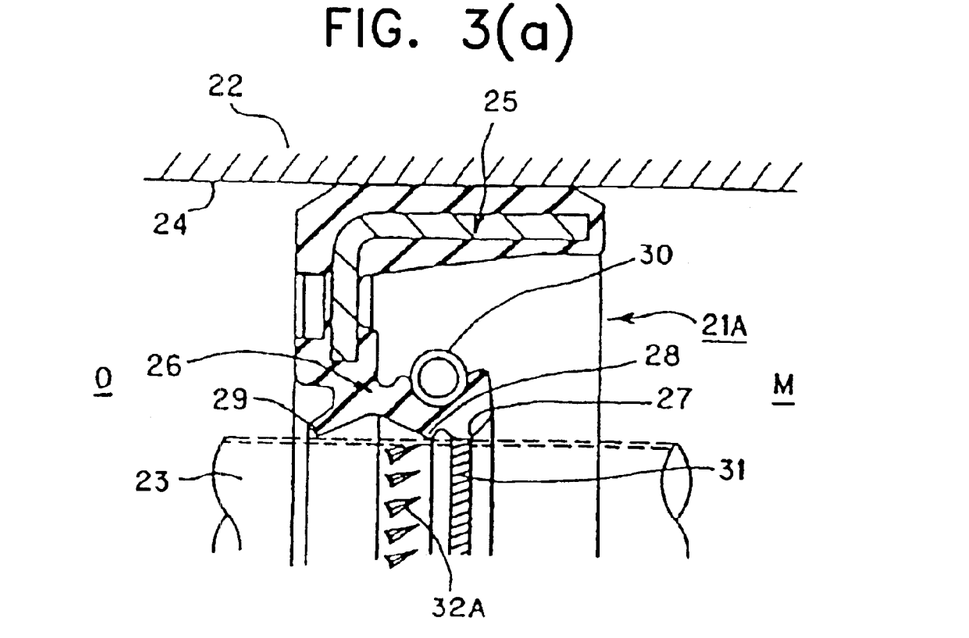
FIGS. 3(a) and 3(b) are partial cross sectional views of a sealing device in a third embodiment of the invention.
Figure 3B:
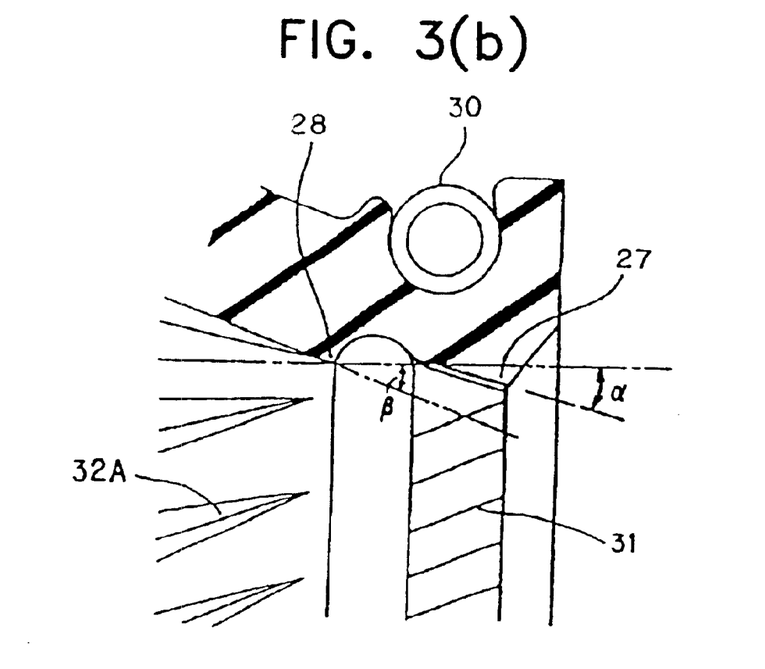

FIGS. 3(a) and 3(b) show a modified sealing device 21A including second ribs 32A which are in the shape of tapered triangular ridges in its cross section. As long as the second ribs 32A are larger in height than that of the first ribs 31, the second ribs 32A may have any tapered shape. The dimension of the first ribs are as follows; the height of the ribs in cross section is from about 0.03 to 0.04 mm, the width of the rib's base is from about 0.8 to 1.2 mm, open angle at the top tip in cross section is from about 115° to 125°, pitch between each first rib is from about 0.9 to 1.15 mm, the angle between the long direction of the rib and peripheral direction of the lip tip is from about 27° to 33°. Corresponding dimensions of the second ribs 32 and 32A are as follows; the maximum height is from about 0.21 mm to 0.19 mm, the width is from about 1.5 mm to 1.9 mm, open angle at the top tip in cross section is from about 115° to 125°, pitch between each first rib is from about 0.9 to 1.15 mm, the angle between the long direction of the rib and peripheral direction of the lip tip is from about 27° to 33°. Other components identical to those in FIGS. 2(a) and 2(b) are given identical reference numerals, and will not be described in detail.

Embodiment 3

Figure 4:
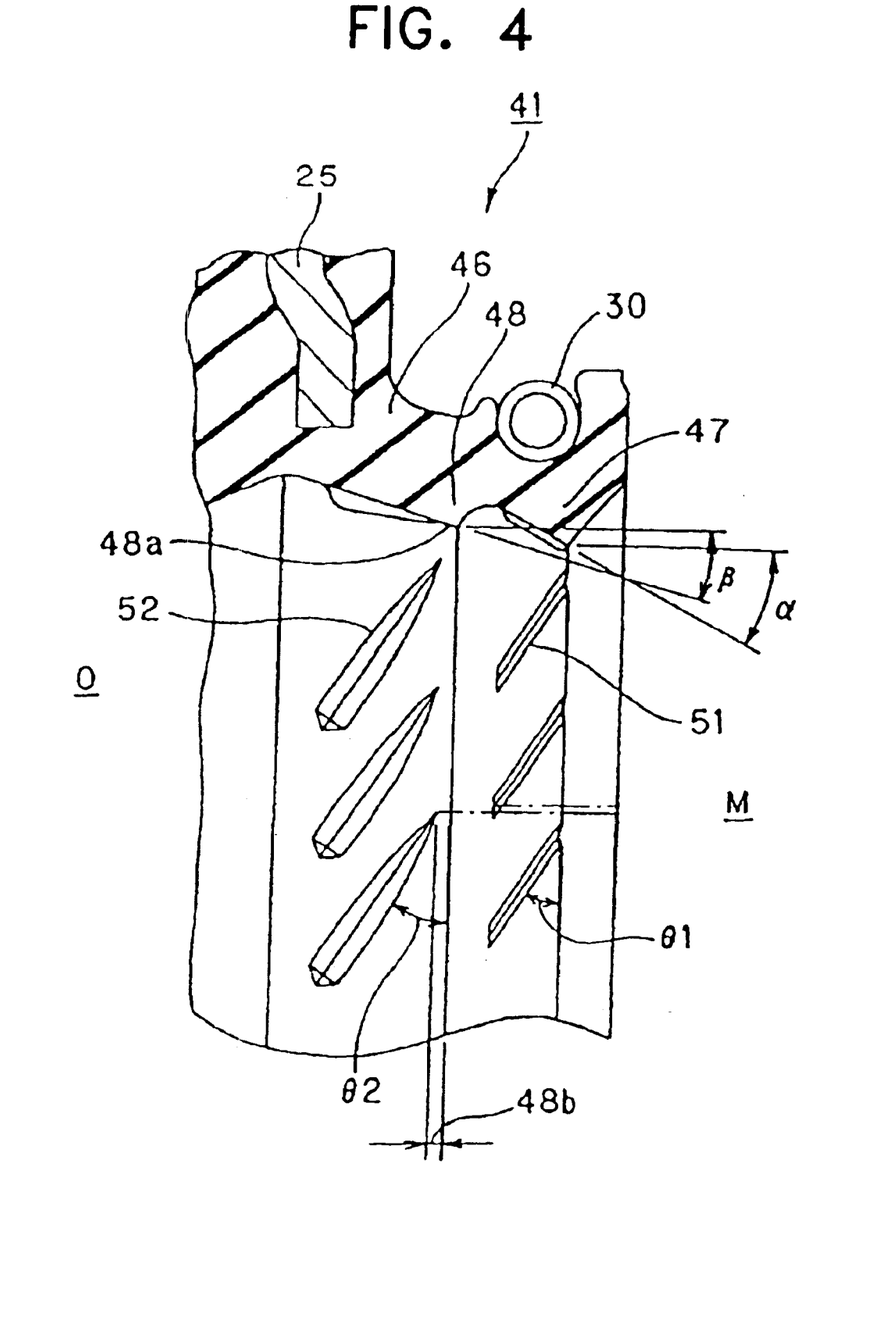
FIG. 4 is a partial cross sectional view of a sealing device in a fourth embodiment of the invention.

In the third embodiment of the invention, a sealing device 41 includes a sealing section 46 as a main sealing part thereof, which is structured as shown in FIG. 4. The sealing device 41 is essentially identical to the sealing device 21 of the second embodiment, and is shown using the same reference numerals.

With the sealing device 41, the sealing section 46 is provided with first and second lips 47 and 48 at its main lip side. The first and second lips 47 and 48 have first and second ribs 51 and 52 respectively, as in the second embodiment.

The first ribs 51 are constituted by small parallel ridges having a shape of somewhat triangular in its cross section while the second ribs 52 are constituted by large bilge-shaped ridges. The height of the second ribs 52 gradually increase from the sealed side M to atmosphere side O, as is the same of the ribs 32 in FIG. 2 or the ribs 32A in FIG. 3.

Specifically, it is preferable that each first rib 51 has a maximum height of 0.005 to 0.1 mm from the surface of the lip 47, an angle θ1 of inclination of 10 to 45 degrees, and an open angle of 90 to 150 degrees at the top in cross section. Further, each second rib 52 preferably has a maximum height of 0.1 to 0.3 mm from the surface of the lip 48, an angle θ2 of inclination of 10 to 45 degrees, and an open angle of 90 to 150 degrees at the top. The heights of the first and second ribs 51 and 52 are preferably in a ratio of 1:3 to 1:10. The ratio of the inner diameter of the first lip to that of the second lip is from about 1.0/1.005 to 1/1.05, preferably from about 1/1.01 to 1/1.03, as described in Embodiment 2.

In this embodiment, the first lip 47 has a lip angle α, which is an angle between the axial direction of the sealing device and the atmosphere-side surface of the first lip as is shown in FIG. 4, is larger than the lip angle β of the second lip 48 (i.e. α>β). As is shown in FIG. 4, the lip angle β is measured as is measured in the angle α. These angle α and β are measured in a free state of the sealing device, that is these angles are measured at the time the sealing device is not attached to the shaft. These lip angles are determined such that leakage of the sealing fluid can be prevented in an optimum manner when the lips are in contact with the sliding surface.

The foregoing relationship of the lip angles allows a sliding surface 48a of the second lip 48 to have a pressure distribution which varies moderately in the axial direction of the sealing device. This is effective in easily guiding the fluid (leaked to the non-sealed side O) to the rubbing surface 48a, so that an improved pumping effect is anticipated.

The rubbing surface 48b is provided on the sloped non-sealed side O of the second lip 48 as a non-ribbed portion between the lip tip of the second lip 48 and the second rib 52 closest to the second lip 48, as is shown in FIG. 4. The rubbing surface is shown but not described with reference to FIG. 2 and FIG. 3 in the second embodiment. The width of rubbing surface 48b is approximately 0.2 mm wide, for example, and is preferably 0.1 to 0.5 mm wide for the following reasons. The non-ribbed portion can suppress the leakage of the sealing fluid when the lips stops sliding on the rotary shaft via their rubbing surface 48b during an initial stage of use.

The first ribs 51 can therefore demonstrate, at the time there is relative movement between the shaft (not shown in FIG. 4) and the sealing device, the pumping effect from the initial use of the sealing device, because the tip of the first ribs 51 is placed near or connected to the tip of the first lip 47. The first ribs slidingly contact with the shaft from initial stage of use of the sealing device. Further, the rubbing surface 48b of the second lip 48 can prevent leakage of fluid to be sealed if fluid flows to the non-sealed side O via the first lip 47 due to the presence of the first ribs 51 when there is no relative movement between the shaft and the sealing device during the initial stage of use.

After the initial stage of use, the tip of the first lip 47 and the first ribs 51 as well has their tips worn out by rubbing between the shaft and the tips of the lips and the ribs, thereby reducing the amount of leaking fluid when non-operational. Further, the pumping effect of the first lip may be reduced due to wearing of the first ribs 51. However, the rubbing surface 48a of the second lip 48 is also worn out, to lead the ribs into contact with the shaft, which will improve the pumping effect of the second ribs 52. Therefore, from the initial stage, the sealing device can not only effectively prevent the leakage of the sealing fluid during the non-operational stage but also keeps on demonstrating the pumping effect during use.

The rubbing surface 48b, i.e. the non-ribbed portion, may have a width of close to zero (less than 0.1 mm, for example). However, in order to determine positions of the second ribs 52 which determine the width of the rubbing surface 48b, and in order to make the ribs in a maimer that the ribs do not mount on the lip of the second lip 48, it is necessary to determine positions of recesses precisely between the second ribs 52 which are formed on a mold. The recesses on the mold correspond to the second ribs 52 of the sealing device. Therefore, the presence of the rubbing surface 48b allows slight axial displacement of the second ribs 52, which improves workability in mold making.

On the contrary, if the rubbing surface 48b has a width of more than 0.5 mm, the pumping effect of the second ribs 52 may be smaller.

The second ribs 52 begin to protrude from the slope of the second lip 48 at a position near but apart from the lip tip of the second lip 48. Therefore, when molding the sealing section an elastic rubber material is made to flow and is filled into the recesses corresponding to the second ribs 52 so that the second lip 48 does not become porous. This is effective in improving moldability of the ribs.

Embodiment 4

Figure 5:
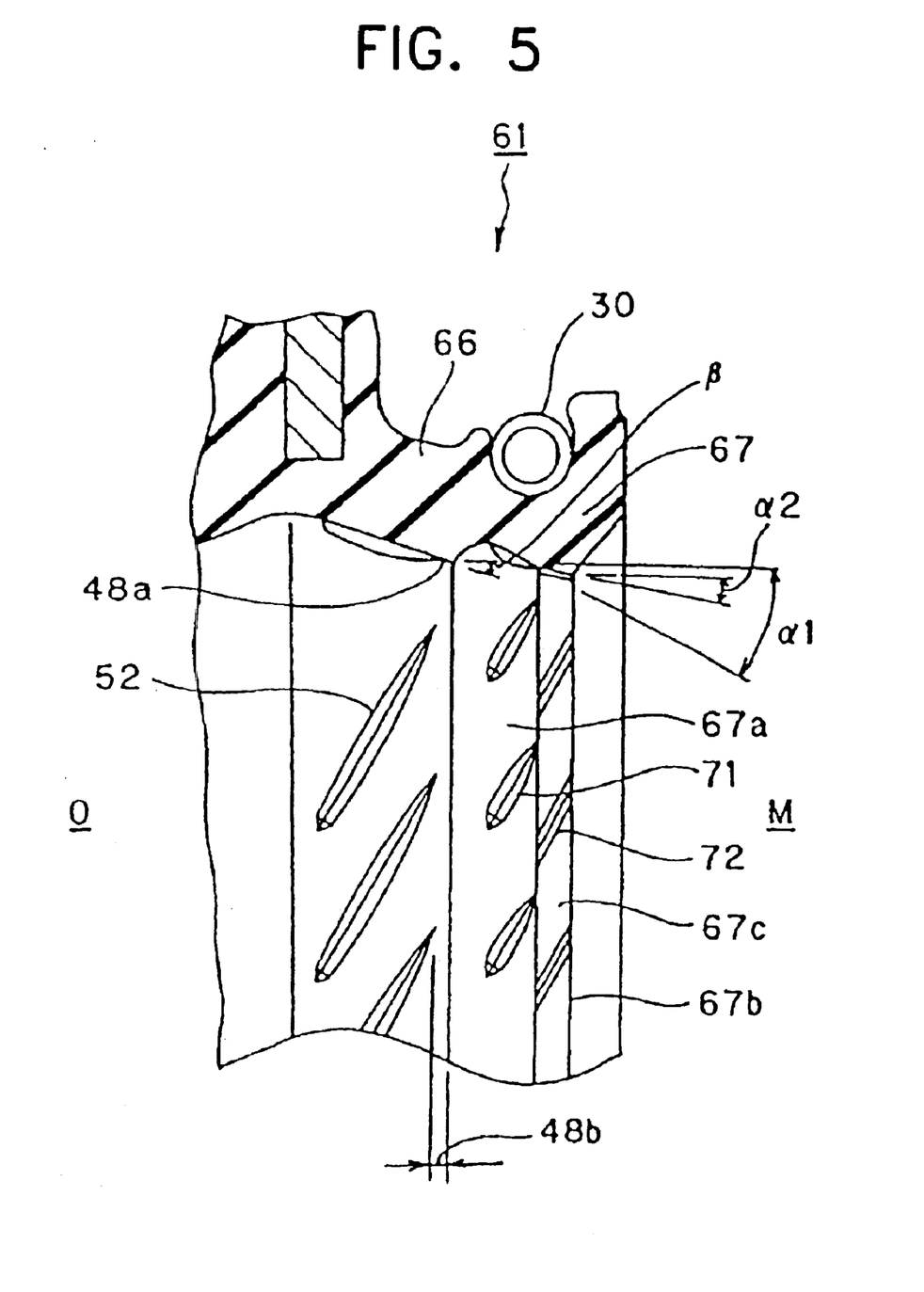
FIG. 5 is a partial cross sectional view of a sealing device in a fifth embodiment of the invention.

Embodiment 4 is the most preferred embodiment of the invention. FIG. 5 shows a main part, i.e. a sealing section 66, of a sealing device 61 according to a fourth embodiment of the invention. The sealing device 61 is substantially identical to the sealing device 41 of the third embodiment, and is shown using same reference numerals for some of the identical portions shown in FIG. 4. The sealing device 61 has a sealing section 66, which has first and second lips 67 and 48. The sealing device 61 is characterized in the first lip 67. Specifically, the non-sealed side O of the first lip 67 has an elongated contact area 67c which is formed between a slope 67a and a lip tip 67b (ridge) of the slope 67a. The first lip 67 slides on the contact area 67c when in use.

A lip angle α1 of the slope 67a is larger than a lip angle α2 of the contact area 67c (i.e. α1>α2) as is shown in FIG. 5. The lip angle is here defined by an angle between the non-sealed side slope of each lip (48, 67a and 67c) and the axial direction of the sealing device as is shown in FIG. 5. Each angle is measured in a free state of the sealing device. The angle α1 is larger than β, whose angle is the angle between the non-sealed side slope of the second lip 48 and the axial direction of the sealing device. The contact area 67c contacts with the surface of the shaft (not shown) at the time the sealing device is mounted on the housing and the shaft (not shown in FIG. 5 but similar to the housing 22 and the shaft 31 in FIG. 2 or 3).

The slope 67a and the contact area 67c are provided with first and third ribs 71 and 72. The third ribs 72 are constituted by a plurality of small parallel ridges while the first ribs 71 are constituted by bilge-shaped ridges which are larger in height and width than the ridges of the third ribs 72.

The contact area 67c functions identically to a lip tip which has been worn out after initial use, and can reliably seal the sealing fluid while the lips are in contact with the rubbing surface on the opposite side or the shaft. The ribs on the contact area 67c are effective in pumping back fluid to be sealed to the sealed side M.

The fourth embodiment operates effectively because of the foregoing configuration. Further, the contact area 67c of the first lip 67 is effective in suppressing changing in shape of the rubbing surface of the first lip 67 due to wearing. Still further, the sealing device of this embodiment can prevent leakage of fluid to be sealed during the non-operation period, and can exert the pumping effect during the operation too, from the initial stage of use.

Though the contact area 67c may not exert the pumping effect if the third ribs 72 is not provided on the contact area 67c, changing in shape of the 67c by wear can be considerably prevented.

The sealing device of the invention is effective in the following respects.

As described so far, the sealing device of the invention has a plurality of lips formed with ribs, which is effective in promoting the pumping effect and improving the sealing performance.

The non-ribbed portion can suppress leakage of fluid to be sealed when the lips stop sliding on the rubbing surface during initial stage of use, and improves the workability of production of the mold for the sealing device and the ease with which the sealing section can be formed.

The elongated contact area functions similarly to the lip tip that wears out by initial use, and is effective in assuring the reliable sealing performance and pumping effect when the lips are in contact with the rubbing surface.

The foregoing configuration enables the first lip to effectively pump fluid to be sealed back toward the sealed side from the beginning of its use, in the case ribs are provided on the elongated contact area, or ribs are provided on the non-sealed side surface of the first lip having no elongated contact area and are placed close to or connected to the lip tip of the first lip. Further, even if fluid may leak to the non-sealed side via the ribs of the first lip at the time the relative movement between the shaft and the lips is stopped, the non-ribbed portion of the second lip can prevent the leakage of fluid toward non-sealed side. This is because the non-ribbed portion of the second lip sealingly contact with the shaft.

The leaking fluid via the ribs on the elongated contact area or the ribs on the non-sealed side of the first lip having no elongated contact area mentioned in the previous paragraph, at the time there is no relative movement between the lip and the shaft, may be reduced by the wearing of the tip of the first lip. It is also probable that the pumping effect of the ribs of the first lip may be reduced due to wear. However, as the non-ribbed portion of the second lip becomes worn out, the second lip is expected to demonstrate the pumping effect, as the ribs on the second lip gradually become to contact with the shaft by wearing the tip of the second lip. Therefore, the sealing device can not only prevent the leakage of the sealing oil during the initial use but also assure a reliable pumping operation during its entire use.

As the ribs are realized in the shape of spiral ridges projecting from the slopes, so pumping function can be improved and sealing performance of the sealing section can be improved as well. The ribs are made in the mold by cutting or stamping on the surface of a specific positions of the mold using hard objects. Therefore, the molds with recesses can be easily manufactured at a reduced cost.

What is claimed is:

1. A sealing device comprising:

a fitting portion fixed on a first surface forming an annular gap with a second surface, a single sealing section supported by a support of the fitting portion, said single sealing section including a plurality of axial lips with lip tips of the axial lips coming into contact with the second surface, the annular gap being sealed by said plurality of axial lips to isolate a sealed side on one side of said single sealing section and a non-sealed side on an opposite side of said single sealing section, a first axial lip being located on the sealed side relative to a second axial lip located on the non-sealed side, the second axial lip supporting the first axial lip, and ribs for pumping a sealing fluid to the sealed aide being formed on the plurality of axial lips at the non-sealed side, a single surface of the first axial lip of said plurality of axial lips extending from the lip tip of the first axial lip on the non-sealed side and extending to and terminating at a single surface of the second axial lip of said plurality of axial lips extending from the lip tip of the second axial lip on said sealed side, said second axial lip including a non-ribbed portion located between said lip tip of said second axial lip and the ribs on the non-sealed side of said second axial lips, an inner diameter of said first axial lip being less than an inner diameter of said second axial lip so as to prevent the ribs of the second axial lip from coming into contact with a rotary shaft prior to the ribs of the first axial lip and said ribs of said second axial lip can cope with an eccentricity of the rotary shaft.

2. The sealing device according to claim 1, wherein an elongated contact area is formed at the lip tip of the second axial lip, and has a lip angle which is smaller than a lip angle formed by the slope of the non-sealed side of the first axial lip and the second surface.

3. The sealing device according to claim 1, wherein the first axial lip is provided at the lip tip thereof with an elongated contact area having the ribs for pumping the sealing fluid, and has a lip angle that is smaller than a lip angle formed by the sloped non-sealed side of the second axial lip and the second surface.

4. The sealing device according to claim 1, wherein at least one of the ribs on the plurality of axial lips is a spiral ridge projecting from a slope of the non-sealed side.

5. A sealing device comprising:

a fitting portion fixed on a first surface forming an annular gap with a second surface;

a single sealing section supported by a support of the fitting portion, said single sealing section including a plurality of axial lips with lip tips coming into contact with the second surface;

the annular gap being sealed by said plurality of axial lips to isolate a sealed side on one side of said single sealing section and a non-sealed side on an opposite side of said single sealing section;

ribs for pumping a sealing fluid to the sealed side being formed on the plurality of axial lips at the non-sealed side;

one of the plurality of axial lips on the non-sealed side being spaced from an adjacent lip of the plurality of lips on the sealed side and said one lip being provided with a non-ribbed portion between the lip tip of said one lip and the ribs on a slope of the non-sealed side of said one lip;

the non-ribbed portion having a width between 0.1 to 0.5 mm from the lip tip.

* * * * *